Patented July 29, 1952

2,605,259

UNITED STATES PATENT OFFICE 2,605,259

ALCOHOLYSIS OF POLYVINYL ESTERS

Leo M. Germain, Shawinigan Falls, Quebec, Canada, assignor to Shawinigan Chemicals Limited, Montreal, Quebec, Canada, a corporation of Canada No Drawing. Application March 3, 1950,
Serial No. 147,578

10 Claims. (Cl. 260—85.7)

This invention relates to the alkaline alcoholysis of polyvinyl ester to give the partially hydrolyzed product, hereinafter called polyvinyl ester-alcohol, or the substantially fully hydrolyzed product.

The reaction of a polyvinyl ester with an alcohol in the presence of relatively small amounts of an alkaline catalyst to form partially or completely hydrolyzed products is well known in the art. U. S. Patent 2,227,997 to Berg describes a process using a proportion of alcohol (plus inert diluent, if any) such that the polyvinyl derivative is apparently not completely dissolved, but a plastic or doughy mass is formed and kneaded during the reaction. The inert solvent or diluent may be the same ester as is formed by the reaction of the alcohol with the polyvinyl ester but other inert solvents may be used, such as acetone or benzol. The polyvinyl ester-alcohol is obtained, in preference to the polyvinyl alcohol, by using less than the stoichiometric equivalent of alcohol, or by interrupting the reaction (at the desired point) by either neutralizing the catalyst or adding water to the reaction mixture.

U. S. Patent 2,266,996 to Scott et al. discloses a minor modification of Berg's process using simpler mechanical equipment at the expense of much more solvent than Berg uses. The diluent is restricted to the ester suggested by Berg, the ratio of ester to alcohol being maintained within a specified range. The degree of hydrolysis can be regulated by varying the ratio of ester to alcohol.

Both these processes have the disadvantage of yielding a product non-uniform from batch to batch or within a given batch even when all conditions are apparently the same.

It is an object of the present invention to provide an improved method of preparing polyvinyl ester-alcohol wherein the reaction mass requires only mild mechanical working during the reaction, and there is a reduced tendency for the reaction products to adhere to the walls or stirrers of the reaction vessel.

These objects are accomplished in accordance with the present invention by the alcoholysis with methanol of a polyvinyl ester of an unsubstituted saturated aliphatic monocarboxylic acid in the presence of excess methanol above that required to react with the polyvinyl ester, an alkaline alcoholysis catalyst, and a volatile liquid petroleum distillate fraction, the reaction mass being mechanically worked during the reaction. Up to 50% of the excess methanol may be replaced by the methyl ester corresponding to the polyvinyl ester used. A relatively small proportion of water may also be present.

In a preferred embodiment of the invention, the polyvinyl ester in solution in the methanol (and methyl ester, if any) is run into a kettle equipped with egg-beater type stirrers simultaneously with the catalyst in solution in a small part of the methanol. When the viscosity of the reaction mixture begins to increase and before gelation develops, the petroleum fraction is added. The addition of the petroleum fraction to the reaction mixture serves more than dilution. The miscibility of the petroleum fraction with a methanol solution of polyvinyl ester is limited, and in order adequately to decrease the strength of the gel produced during alcoholysis the quantity of petroleum fraction must be enough to form a two-phase system; as the viscous mass is stirred the petroleum fraction is dispersed into the solution of polyvinyl ester and as it gels phase inversion takes place, the swollen soft polyvinyl ester-alcohol becoming the dispersed phase. The power required by the stirrer under these conditions is sharply reduced below that required to process the same weight of polyvinyl ester using only the usual alcohol or alcohol-ester in an amount equal to the sum of the alcohol (or alcohol and ester) and petroleum fraction used in the present invention.

As the reaction continues the gel breaks down into a non-sticky powder which is readily separated by filtration or decantation from excess liquid, and is easily dried. However, the resin is preferably left in contact with the stirred liquid either in the same or in a second vessel with a slower stirrer until the reaction is stopped by the automatic destruction of the catalyst or its neutralization as noted below.

Only a small quantity of original or reacted ester remains adhering to the walls of the two kettles even after a large number of runs. In sharp contrast, large amounts adhere to the walls when the reaction is carried out in the absence of the petroleum fraction; inded, it is necessary to clean the kettle after eight or ten runs.

Suitable catalysts for the alcoholysis reaction are the alkali metal hydroxides or alcoholates, preferably the hydroxides of sodium or potassium. In the case of sodium hydroxide the amount required ranges from 0.3% to 1.2% based by weight on the resin, usually from 0.4% to 1.0%. The molecular equivalent of potassium hydroxide may also be used.

The petroleum distillate is a fraction preferably colorless and with a maximum boiling point less than about 200° C. One particularly suitable fraction has a boiling range 85°–145° C., and is sold under the trade mark "Iosol 1927." The weight ratio of methanol to petroleum fraction used in the reaction mixture may vary over a considerable range between about 2.5 and about 0.9, preferably between about 2.2 and about 1.0. Part of this may be used in the original solution of polyvinyl ester to reduce the viscosity for a given concentration of ester.

Commercial polyvinyl esters, particularly those of the lower acids, normally contain some water but is is desirable to have present in the reacting solution a larger amount than that derived in this way. The water catalyzes or otherwise accelerates the destruction of the catalyst by its reaction with methyl ester to form methanol and sodium salt of the acid residue of the polyvinyl ester and thus the rate of reaction falls off to a low value and finally stops much sooner than it does in the presence of traces of water. In other words, the graph of "polyvinyl ester content" in the polyvinyl ester-alcohol plotted against "time" flattens out at a higher polyvinyl ester content. Although it is not an essential feature of the invention, it is preferable to stop the reaction by neutralization of the catalyst when the desired composition is attained as indicated by a study of the type shown in Example 6. The slow reaction, induced by the water present is an aid in obtaining accurately predicted composition of product. Alternatively, the conditions may be selected so that the reaction stops at the desired composition of the polyvinyl ester-alcohol. The water content of the reacting solution is best controlled by using an anhydrous solution of catalyst and having a known content of water in the resin solution, which may, for example, be conveniently determined by the Karl Fischer reagent.

If it is desired to use this feature of the invention, the water content of the reacting solution, expressed as per cent by weight on the resin, should be between one and five per cent, the lower part of the range being preferred when high concentrations of resin are used and/or when low residual-ester polymers are wanted, and the higher for low concentrations of resin and/or higher residual-ester polymers. The use of water in the alcoholysis reaction is contra-indicated by all the prior art.

Part of the methanol present in the original reaction mixture may be replaced by the methyl ester of the acid corresponding to the polyvinyl ester, but the amount of methanol used must always be in excess of the stoichiometric equivalent required to carry the alcoholysis to the desired degree. Up to 50% by weight, but preferably not more than 20%, of the excess methanol may be replaced.

The reaction may be carried out over a wide range of temperatures, preferably between 10° C. and 40° C. With decreasing temperatures both the alcoholysis reaction and the destruction of the catalyst are slower, so that the slowing up and stopping of the main reaction by disappearance of the catalyst is retarded. With increasing temperatures, the catalyst is destroyed sooner. The inner preferred range is 20° C. to 30° C.

*Example 1*

Solution A:

| | G. |
|---|---|
| Polyvinyl acetate, 7 cps. | 1000 |
| Methanol | 750 |
| "Iosol 1927" | 150 |
| Water | 25 |

Solution B:

| | |
|---|---|
| Methanol | 250 |
| Sodium hydroxide | 6 |

The two solutions, both at 20° C., were charged simultaneously at a uniform rate during a period of about one and one-half minutes into a kettle equipped with a pair of interacting stirrers of the egg-beater type. Three minutes after the last influx of the solutions 850 grams of "Iosol 1927," also at 20° C., were added to the kettle during about one minute; the action of the stirrers immediately dispersed it into the charge. Within a few minutes there was a noticeable increase in viscosity of the charge, which soon changed to a weak gel and shortly thereafter broke to a fine powder dispersed in a clear liquid. After a few minutes more, the whole reaction mass, liquid and solid, was emptied by a bottom discharge into a second kettle where it was kept in motion by a slow-moving anchor-type stirrer. There was no tendency for the fine gel fragments to adhere to each other to form lumps, or to adhere to the walls of the kettle.

Two hours from the first influx of the solutions into the first reaction kettle, about 9 grams of acetic acid (the equivalent of the catalyst used), dissolved in a little methanol, were added to the slurry in the second kettle to stop the reaction. After a few minutes further stirring, the fine powder was filtered from the liquid and dried. The dry product analysed 30.6% by weight polyvinyl acetate.

*Examples 2–5*

Examples 2 to 5 were carried out using the procedure of Example 1 with the variations indicated in Table 1, giving a product analysis as shown. The reduced concentration of resin in Example 4 compensated for its increased viscosity so that the time to the formation and breaking of the gel was only very slightly increased. In Example 5, however, the time was considerably longer.

*Example 6*

The procedure of Example 1 was repeated except that the reaction was carried out at 30° C. instead of 20° C. and all the product was not neutralized. The gel developed and broke several minutes earlier than in Example 1. Small samples were withdrawn at intervals reckoned from the first influx of the solutions to the kettle, neutralized by washing in methanol kept weakly acidic with acetic acid, dried, and analysed. The results are shown:

| Time—Mins. | P. V. Acetate, Percent |
|---|---|
| 30 | 43.5 |
| 60 | 37.2 |
| 90 | 35.1 |
| 120 | 33.5 |
| 150 | 33.3 |
| 180 | 32.7 |
| 240 | 32.6 |
| 300 | 32.0 |
| 360 | 31.9 |

These examples have described the alcoholysis of polyvinyl acetate. However, the invention is also applicable to other polyvinyl esters such as, for example, the formate, the propionate, the butyrate. It is also applicable to the copolymers of vinyl esters with another polymerizable compound, for example, with ethylene, with acrylic acid and its esters, and with methacrylic acid and its esters, wherein at least 50% by weight of the copolymer is vinyl ester.

The process of the invention is of particular value in the manufacture of polyvinyl ester-alcohol wherein the mole fraction of ester lies between one-twentieth and one-third (in the case of polyvinyl acetate between ten and fifty per cent by weight). It may, however, be also used for the manufacture of products containing even less ester, including completely hydrolyzed polyvinyl ester.

It is to be understood that the invention is not restricted to the specific embodiments thereof described hereinabove but embraces all such variations, modifications, and equivalents as fall within the scope of the appended claims.

Table I.—Examples 1-5

| Ex. | Solution A | | | | | | Solution B | | Added "Iosol" grams | Product P. V. Acet., percent |
|---|---|---|---|---|---|---|---|---|---|---|
| | P. V. Acet. grams | Visc. cps. | MeOH grams | MeOAc grams | "Iosol" grams | H₂O grams | MeOH grams | NaOH grams | | |
| 1 | 1,000 | 7 | 750 | | 150 | 25 | 250 | 6 | 850 | 30.6 |
| 2 | 1,000 | 7 | 675 | 75 | 150 | 25 | 250 | 8 | 850 | 30.2 |
| 3 | 1,000 | 7 | 750 | | 150 | 20 | 250 | 6 | 850 | 18.4 |
| 4 | 700 | 15 | 750 | | 150 | 25 | 250 | 4.2 | 850 | 20.8 |
| 5 | 200 | 500 | 750 | | 150 | 20 | 250 | 1.6 | 850 | [1] 17.4 |

[1] Neutralized after 90 minutes.

I claim:

1. A process for the alkaline alcoholysis of polyvinyl ester comprising the reaction, with methanol, of a polyvinyl ester of an unsubstituted, saturated, aliphatic monocarboxylic acid under mild mechanical working in the presence of excess methanol, an alkaline alcoholysis catalyst, and a petroleum distillate fraction whose maximum boiling point is below 200° C. in an amount sufficient to cause the formation of a two phase system during reaction all of the polyvinyl ester being in solution in the methanol at the beginning of the reaction, the petroleum distillate fraction being the dispersed phase at the beginning of the reaction and inverting to the dispersing phase as the reaction proceeds.

2. A process according to claim 1, wherein the polyvinyl ester is polyvinyl acetate.

3. A process according to claim 1, wherein water in the range between one and five per cent by weight on the polyvinyl ester is also present.

4. A process according to claim 1, wherein a methyl ester corresponding to the polyvinyl ester is present in the original solution of the polyvinyl ester up to 50% by weight of the excess methanol.

5. A process according to claim 1 wherein the weight ratio of methanol to petroleum distillate fraction lies within the limits of 2.5 and 0.9.

6. A process according to claim 1, wherein the catalyst is sodium hydroxide.

7. A process according to claim 1, wherein the polyvinyl ester contains a portion of another monomer copolymerized therewith not exceeding the weight of the polyvinyl ester.

8. A process according to claim 2 wherein water in the range between 1% and 5% by weight on the polyvinyl acetate is also present.

9. A process according to claim 8 wherein methyl acetate is present in the original reaction mixture up to 50% by weight of the excess methanol.

10. A process according to claim 2 wherein the polyvinyl acetate contains a portion of another monomer copolymerized therewith not exceeding the weight of the polyvinyl acetate.

LEO M. GERMAIN.

REFERENCES CITED

The following references are of record in the file of this patent:

UNITED STATES PATENTS

| Number | Name | Date |
|---|---|---|
| 2,502,715 | Germain | Apr. 4, 1950 |